United States Patent [19]

Hahn et al.

[11] Patent Number: 5,010,111

[45] Date of Patent: Apr. 23, 1991

[54] FLAME RESISTANT, EXPANDABLE STYRENE POLYMERS AND FOAMS, AND FLAME RETARDANTS

[75] Inventors: Klaus Hahn, Kirchheim; Uwe Guhr, Gruenstadt; Hans Hintz, Ludwigshafen; Dietmar Wittenberg, Mannheim; Peter Gleich, Ludwigshafen, all of Fed. Rep. of Germany

[73] Assignee: BASF Aktiengesellschaft, Ludwigshafen, Fed. Rep. of Germany

[21] Appl. No.: 565,100

[22] Filed: Aug. 10, 1990

[30] Foreign Application Priority Data

Aug. 26, 1989 [DE] Fed. Rep. of Germany ....... 3928284

[51] Int. Cl.$^5$ ................................................ C08J 9/20
[52] U.S. Cl. .......................................... 521/56; 521/57; 521/59; 521/76; 521/84.1; 521/90; 521/98; 521/136; 521/138; 521/139; 521/907
[58] Field of Search ............... 521/56, 57, 59, 60, 521/76, 84.1, 90, 98, 136, 138, 139, 907

[56] References Cited

U.S. PATENT DOCUMENTS

| | | | |
|---|---|---|---|
| 3,093,599 | 6/1963 | Mueller-Tamm et al. | 521/59 |
| 3,669,923 | 6/1972 | Hintz | 521/98 |
| 3,755,209 | 8/1973 | Nintz et al. | 521/88 |
| 3,968,060 | 7/1976 | Vincent et al. | 521/85 |
| 4,085,169 | 4/1978 | Saito et al. | 521/56 |
| 4,129,706 | 12/1978 | Keppler et al. | 521/56 |
| 4,281,067 | 7/1981 | Kienzle et al. | 521/98 |
| 4,311,636 | 1/1982 | Hahn et al. | 521/94 |
| 4,393,146 | 7/1983 | Rigler et al. | 521/56 |
| 4,517,314 | 5/1985 | Reese et al. | 521/56 |
| 4,761,432 | 8/1988 | Sonnenberg et al. | 521/59 |

Primary Examiner—Morton Foelak
Attorney, Agent, or Firm—Oblon, Spivak, McClelland, Maier & Neustadt

[57] ABSTRACT

Flame-resistant, expandable styrene polymers containing a styrene (co)polymer, from 0.4 to 6% by weight of hexabromocyclododecane having a mean particle size of from 1 to 50 μm, the particles being provided with a firm coating which has a thickness of from 1/100 to 1/10 of the particle diameter and is insoluble in water and styrene, from 1 to 10% by weight of a $C_3$- to $C_6$-hydrocarbon as blowing agent, and, if desired, customary additives, are distinguished by a reduced internal water content and can be processed to form foams which have an improved foam structure and high UV stability.

4 Claims, No Drawings

FLAME RESISTANT, EXPANDABLE STYRENE POLYMERS AND FOAMS, AND FLAME RETARDANTS

Hexabromocyclododecane has been used for some time in industry as a flame retardant for the preparation of flame resistant, expandable styrene polymers and foam moldings produced therefrom. Expandable styrene polymers of this type have a relatively high internal water content, the foam structure of the moldings is unsatisfactory, and the foams are sensitive to UV radiation.

It is an object of the present invention to reduce the internal water content, to improve the foam structure and to improve the resistance to UV radiation.

We have found that, surprisingly, these objects can all be achieved by using hexabromocyclododecane having a mean particle size of from 1 to 50 μm whose particles are provided with a firm coating which has a thickness of from 1/100 to 1/10 of the particle diameter and is insoluble in water and in styrene.

Accordingly, the invention provides bead-form, flame resistant, expandable styrene polymers containing (a) polystyrene and/or a styrene copolymer containing 50% by weight or more of copolymerized styrene, (b) from 0.4 to 6% by weight, based on (a), of hexabromocyclododecane having a mean particle size of from 1 to 50 μm, these particles being provided with a firm coating which has a thickness of from 1/100 to 1/10 of the particle diameter and is insoluble in water and in styrene, (c) from 1 to 10% by weight, based on (a), of an aliphatic $C_3$- to $C_6$-hydrocarbon as blowing agent, and, if desired, (d) customary additives in effective amounts.

The invention furthermore provides flame retardant foams which contain hexabromododecane of this type, and also provides flame retardants essentially comprising hexabromocyclododecane having a mean particle size of from 1 to 50 μm, the particles being provided with a firm coating which has a thickness of from 1/100 to 1/10 of the particle diameter and is insoluble in water and in styrene.

Surprisingly, the dimensional stability of the foam moldings produced from the novel, expandable styrene polymers is also improved.

The principal component (a) present in the novel products is polystyrene and/or a styrene copolymer containing 50% by weight or more, preferably 80% by weight or more, of copolymerized polystyrene. Examples of suitable comonomers are α-methylstyrene, ring-halogenated styrenes, ring-alkylated styrenes, acrylonitrile, esters of acrylic or methacrylic acid with alcohols having from 1 to 8 carbon atoms, N-vinylcarbazole, maleic acid and maleic anhydride. A small amount of a crosslinking agent, i.e. a compound containing more than 1, preferably 2, double bonds, such as divinylbenzene, butadiene or butanediol diacrylate, is advantageously copolymerized in the polystyrene. The crosslinking agent is generally used in an amount of from 0.005 to 0.05 mol-%, based on styrene.

In order to achieve particularly high expandability, it is expedient for the styrene polymer to have a mean molecular weight of $M_w$ (weight average), measured by the GPC method, of from 60,000 to 200,000, in particular from 130,000 to 180,000. The foam has improved processing properties if the high-molecular-weight edge of the molecular weight distribution curve measured by the GPC method is so steep that the difference in the means $(M_{Z+1}-M_Z)$ is less than 150,000. The GPC method is described in G. Glöckler, Polymercharakterisierung, Chromatographische Methoden, Volume 17, Hüthig-Verlag, Heidelberg, 1982. The means mentioned are described in H. G. Elias, Makromoleküle, Hüthig-Verlag, Heidelberg, 1971, pages 52–64.

Styrene polymers which have the abovementioned mean molecular weights can be obtained by carrying out the polymerization in the presence of regulators, expediently from 0.01 to 1.5% by weight, preferably from 0.01 to 0.5% by weight, of a bromine-free organic compound having a chain-transfer constant K of from 0.1 to 50. In order to achieve a steep high-molecular-weight edge of the molecular weight distribution curve, the regulator is expediently not added until a polymerization conversion of from 20 to 90% has been reached.

An advantageous, high expansion capacity can also be achieved if component (a) contains from 0.1 to 10% by weight, advantageously from 0.5 to 10% by weight, of a styrene polymer having a mean molecular weight (weight average) of from 500 to 5,000.

Further details on molecular weight regulation in the preparation of expandable styrene polymers are given in EP-B 106,129.

Styrene polymers which contain from 0.1 to 2% by weight, preferably from 0.15 to 1.5% by weight, of copolymerized acrylonitrile result in foams which are distinguished by the substantial absence of shrinkage. These properties are also exhibited by a mixture comprising from 95 to 99.5% by weight of polystyrene and from 0.5 to 5% by weight of a styrene-soluble styrene-acrylonitrile copolymer if the total content of acrylonitrile in the mixture is from 0.1 to 2% by weight, preferably from 0.15 to 2% by weight.

Styrene polymers which contain from 3 to 20% by weight, preferably from 5 to 15% by weight, of copolymerizable acrylonitrile result in foams having high oil resistance. This advantageous property is also exhibited by a mixture comprising from 50 to 85% by weight of polystyrene and from 15 to 50% by weight of a styrene-soluble styrene-acrylonitrile copolymer if the total content of acrylonitrile in the mixture is from 3 to 20% by weight, preferably from 5 to 15% by weight. Mixtures of this type can be prepared in a simple manner by dissolving the proposed amount of styrene-acrylonitrile copolymer in styrene before the polymerization.

Styrene polymers which contain from 2 to 15% by weight, in particular from 3 to 12% by weight, of maleic acid or maleic anhydride as comonomer result in foams which are distinguished by high heat-distortion resistance. The starting material here is advantageously a mixture of polystyrene and a commercially available styrene-maleic anhydride copolymer containing from 15 to 49% by weight of maleic anhydride; the mixture can easily be prepared by dissolving the copolymer in styrene followed by polymerization.

As component (b), which is essential to the invention, the expandable styrene polymers contain from 0.4 to 6% by weight, preferably from 0.5 to 4% by weight, in particular from 0.6 to 3% by weight, based on the styrene polymer, of hexabromocyclododecane having a mean particle size of from 1 to 50 μm, preferably from 2 to 40 μm, in particular from 3 to 30 μm. The particles are provided with a solid, water- and styrene-insoluble coating having a thickness of from 1/100 to 1/10, preferably from 1/50 to 1/20, of the particle diameter. All known organic coating agents which are customary for microencapsulation and satisfy the requirement for insolubility in water and in styrene, such as amino resins, melamine resins, phenolic resins, polyurethanes, polyureas, polyesters, polycarbonates, polyamides, polyolefins or natural products, such as hardened gelatin, are suitable.

The coating can be applied by conventional processes of microencapsulation, as described, for example, in Kirk-Othmer, Encyclopedia of Chemical Technology, 3rd Edition, Vol. 15 (1981), pages 470–493, for example by adding the necessary amount of a coating agent, emulsified in water, to an aqueous suspension of the hexabromocyclododecane and precipitating it onto the hexabromocyclododecane particles. The starting material is advantageously a precondensate of the coating agent, which is added in the form of an aqueous solution or dispersion to an aqueous suspension of hexabromocyclododecane. After a suitable curing agent is added, the coating agent is precipitated on the substrate and encapsulates the particles. The coating can also be prepared by slowly adding the precondensate to a stirred aqueous dispersion of the hexabromocyclododecane together with the curing agent. The coated product is subsequently separated off from the aqueous phase and dried. Suitable coating agents are, inter alia, the aqueous polyurethane or polyester-polyurethane dispersions which are described in DE-A 2,645,779 and can be precipitated onto the hexabromocyclododecane at a pH of from 5 to 9 and at from about 20° to 90° C.

Particular preference is given to the coating agents described in EP-B-26,914, in particular melamineformaldehyde precondensates and/or the $C_1$- to $C_4$-alkyl ethers thereof, in combination with an acid acting as the curing agent, for example a water-soluble polymer carrying sulfonic acid groups.

As blowing agents (c), the expandable styrene polymers contain from 1 to 10% by weight, preferably from 3 to 8% by weight, in particular from 4 to 7% by weight, based on (a), of an aliphatic $C_3$- to $C_6$-hydrocarbon, such as propane, butane, isobutane, n-pentane, neopentane and/or hexane. A commercially available pentane mixture is preferred.

The expandable styrene polymers may furthermore contain conventional additives in effective amounts, such as dyes, fillers, stabilizers, flame retardants, synergists, nucleating agents, lubricants, antistatics, substances which have an antiadhesive effect on foaming, and agents for reducing the demolding time on expansion.

Other suitable additives are poly(2,6-dimethyl)-1,4-phenylene ether and poly-1,4-phenylene-sulfide. In amounts of from 1 to 20% by weight, based on component (a), these additives increase the heat distortion resistance of the foam.

According to German Patent Application P 39 15 602.8-44, other suitable additives are styrene-soluble elastomers, which increase the elasticity of the foam.

The expandable styrene polymers are generally in the form of beads and advantageously have a mean diameter of from 0.1 to 6 mm, in particular from 0.4 to 3 mm.

The preperation is advantageously by conventional suspension polymerization. To this end, the coated hexabromocyclododecane and, if desired, the additives are mixed with styrene, and this mixture is polymerized in aqueous suspension. A regulator or a small amount, from about 0.005 to 0.05 mol- %, based on styrene, of a cross-linking agent is advantageously added during the polymerization. The blowing agent and, if used, the additives can be introduced before or during the polymerization. The blowing agent can also be added after the polymerization is complete.

The bead-form, expandable styrene polymers obtained are then separated off from the aqueous phase, washed and dried.

To produce foams, the expandable styrene polymers are expanded in a conventional manner by heating to above their softening point, for example using hot air or preferably using steam. After cooling possibly after interim storage, the foam particles obtained can be foamed further by re-heating and can subsequently be welded in a conventional manner in molds which do not close to form a gas-tight seal to form moldings.

The foams can also be produced by extrusion. To this end, the styrene polymer is mixed with the coated hexabromocyclododecane and a conventional blowing agent or blowing agent mixture comprising a hydrocarbon, halogenated hydrocarbon and/or $CO_2$, and the melt is forced through a nozzle to form a foam.

The foams obtained have a density of from about 0.01 to 0.1 $g/cm^3$. Due to their elasticity, they are used, in particular, for shock-absorbent packaging, as the core material for automotive shock absorbers, for the internal panelling of motor vehicles, as a cushioning material, and as a thermally insulating and soundproofing material.

Parts in the examples are by weight.

EXAMPLE A

Coating of the Hexabromocyclododecane 940 parts of water, 800 parts of hexabromocyclododecane and, as curing agent, 160 parts of a 20% strength solution of the sodium salt of poly-2-acryl-amido-2-methylpropanesulfonic acid are introduced into a stirred vessel fitted with a disperser (Jahnke und Kunkel Turrax 45N), and the mixture is adjusted to pH 4.5 and heated to 60° C. 252 parts of a pH 4.5 aqueous solution containing 120 parts of a partially methylated melamineformaldehyde precondensate (melamine:formaldehyde:methanol molar ratio=1:5.25:2.3) are added over the course of 60 minutes at a stirring speed of about 8000 rpm. Stirring is subsequently continued at 500 rpm for 3.5 hours at 60° C., and the dispersion is cooled to room temperature, adjusted to pH 7 and then spray-dried. The coated hexabromocyclododecane obtained has a mean particle size of 7.5 $\mu$m. The coating thickness is 0.3 $\mu$m. The coating is insoluble in water and styrene.

EXAMPLES 1 TO 10

A mixture of 200 parts of water, 0.1 part of sodium pyrophosphate, 100 parts of styrene, 0.45 part of benzoyl peroxide, 0.15 part of tert.-butyl perbenzoate, 7.5 parts of pentane, and the amounts indicated in the table of hexabromocyclododecane (HBCD) and synergist was heated to 90° C. with stirring in a pressure-tight stirred reactor.

After 2 hours at 90° C., 4 parts of a 10% strength aqueous solution of polyvinylpyrrolidone were added.

The mixture was then stirred for a further 5 hours at 90° C. and subsequently for 2 hours at 120° C. After cooling, the bead polymer obtained was separated off from the aqueous phase, washed and surface-dried, and the internal water content was determined by the method of Karl Fischer.

The expandable polystyrene particles obtained were pre-foamed to a bulk density of 15 g/l using flowing steam in a commercially available Rauscher-type stirred prefoamer.

After interim storage for 24 hours, the foam particles were welded to form a block in a Rauscher-type block mold by steam treatment (1.8 bar).

Strips measuring 2×20×40 cm were cut out of the foam blocks using a heated wire.

The afterflame time was measured on strips at an angle of 45° C. which were ignited at the lower end using a luminous natural gas flame. The time before extinction of the flame was measured, and the mean determined from 20 individual measurements. The UV resistance was determined in accordance with ASTM/D1925-70.

The results obtained are collated in the table.

TABLE

| Example | HBCD uncoated [% by wt.] | HBCD coated in accordance with Example A [% by wt.] | Dicumyl peroxide (synergist) [% by wt.] | Internal water [% by wt.] | No. of cells [cells/mm] | Cell structure | Fire behavior (extinction time) | UV resistance |
|---|---|---|---|---|---|---|---|---|
| 1 (comp.) | 0.7 | — | 0.2 | 2.0 | 2–20 | inhomogeneous | 6 | yellowed |
| 2 (comp.) | 0.8 | — | 0.2 | 2.4 | 3–25 | inhomogeneous | 5 | yellowed |
| 3 (comp.) | 1.2 | — | — | 3.1 | 2–30 | inhomogeneous | 3 | yellowed |
| 4 | — | 0.7 | 0.2 | 0.7 | 3–5 | homogeneous | 7 | stable |
| 5 | — | 0.8 | 0.2 | 0.9 | 4–5 | homogeneous | 6 | stable |
| 6 | — | 1.0 | 0.2 | 1.1 | 3–6 | homogeneous | 4 | stable |
| 7 | — | 1.2 | 0.2 | 1.1 | 4–7 | homogeneous | 2.5 | stable |
| 8 | — | 1.2 | — | 1.0 | 3–7 | homogeneous | 3 | stable |
| 9 | — | 1.5 | — | 1.4 | 5–7 | homogeneous | 2.5 | stable |
| 10 | — | 1.7 | — | 1.7 | 5–8 | homogeneous | 2 | stable |

We claim:

1. A bead-form, flame-resistant, expandable styrene polymer containing
   (a) polystyrene and/or a styrene copolymer containing 50% by weight or more of copolymerized styrene,
   (b) from 0.4 to 6% by weight, based on (a), of hexabromocyclododecane having a mean particle size of from 1 to 50 μm, these particles being provided with a firm coating which has a thickness of from 1/100 to 1/10 of the particle diameter and is insoluble in water and in styrene,
   (c) from 1 to 10% by weight, based on (a), of an aliphatic $C_3$- to $C_6$-hydrocarbon as blowing agent, and, if desired,
   (d) customary additives in effective amounts.

2. A process for the preparation of a bead-form, flame-resistant, expandable styrene polymer as claimed in claim 1, which comprises polymerizing styrene and, if desired, further comonomers in aqueous suspension in the presence of from 0.4 to 6% by weight of hexabromocyclododecane having a mean particle size of from about 1 to 50 μm, these particles being provided with a firm coating which has a thickness of from 1/10 to 1/100 of the particle diameter and is insoluble in water and in styrene, and comprises adding, before, during or after the polymerization, from 1 to 10% by weight of a $C_3$- to $C_6$-hydrocarbon as blowing agent and, if desired, effective amounts of customary additives.

3. A flame-resistant foam having a density of from 0.01 to 0.1 g/cm³ and containing
   (a) polystyrene and/or a styrene copolymer containing 50% by weight or more of copolymerized styrene,
   (b) from 0.4 to 6% by weight, based on (a), of hexabromocyclododecane having a mean particle size of from 1 to 50 μm, these particles being provided with a firm coating which has a thickness of from 1/100 to 1/10 of the particle diameter and is insoluble in water and in styrene,
   and, if desired,
   (c) customary additives in effective amounts.

4. A process for the production of a flame-resistant foam as claimed in claim 3, which comprises expanding a bead-form, flame-resistant, expandable styrene polymer as claimed in claim 1 by heating to above the softening point, and welding eh foam particles obtained to one another in a mold which does not close in a gastight manner, by heating.

* * * * *